Patented Nov. 5, 1929

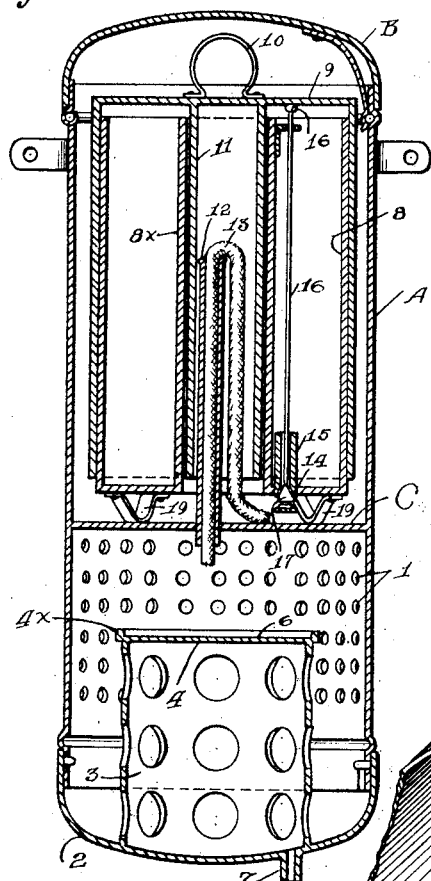
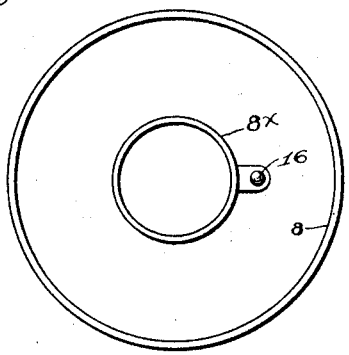
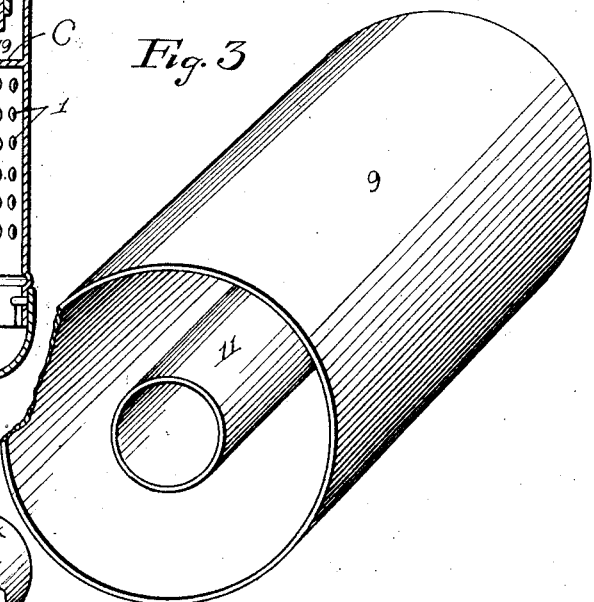
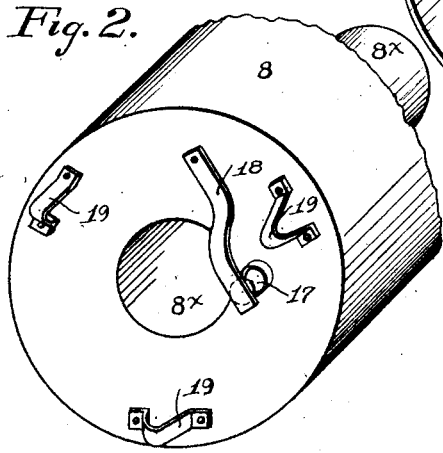

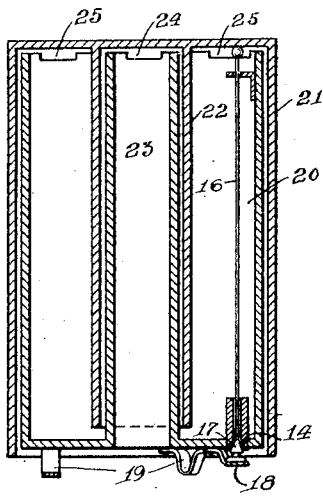
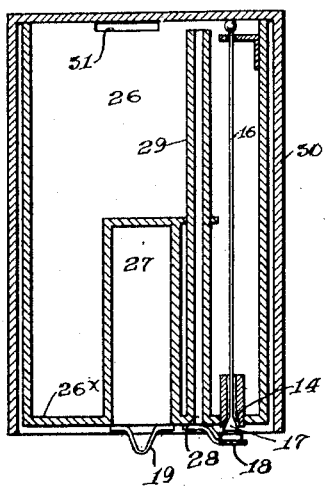
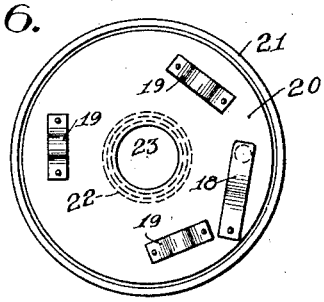
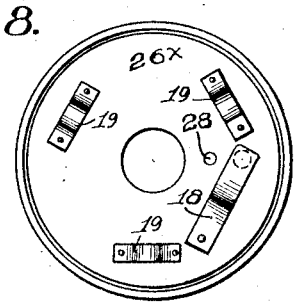
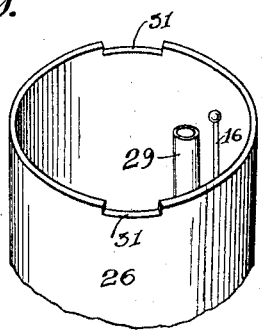

1,734,584

UNITED STATES PATENT OFFICE

LOUIS KOOPERSTEIN, OF NEW YORK, N. Y., ASSIGNOR TO WEST DISINFECTING COMPANY, OF LONG ISLAND CITY, NEW YORK, A CORPORATION OF NEW YORK

DRIP DISINFECTING APPARATUS

Application filed March 5, 1927. Serial No. 172,965.

The object of the present invention is to provide a disinfecting apparatus of that type in which the apparatus holds a supply of liquid which is ejected drop by drop to a given point, usually to a tube leading from the apparatus and to the point where the disinfectant or deodorizing liquid is intended to have its effect. The specific object of the invention is to provide means for more effectively controlling the liquid ejection, so as to insure that the ejection is both uniform and continuous. A further object is to provide elements of the character required in such form as to enable their ready construction and assembly at a low manufacturing cost.

The invention will be understood by reference to the accompanying drawings, in which—

Figure 1 is a vertical section through an apparatus embodying the invention;

Figure 2 is a fragmentary bottom view of the liquid containing member;

Figure 3 is a perspective view of the cover for the liquid containing member;

Figure 4 is a plan view of the liquid containing member;

Figure 5 is a vertical sectional view illustrating a modified form of liquid container and cover, and Figure 6 is a bottom plan view of the same;

Figure 7 is a vertical section through a second modified form of the liquid container and cover, and Figure 8 is a bottom plan view of the same;

Figure 9 is a fragmentary perspective view of the liquid containing member illustrated in Figure 7.

Referring to the drawings, Figure 1, A represents a canister having a hinged top B and a horizontal dividing wall C, below which the canister is formed with perforations 1 for the passage of air. The canister is provided with a cup-like bottom 2 from which rises an annular perforated shell 3 which is closed at its top by wall 4, the wall being provided with a projecting annular flange $4^x$ to afford a shallow cup-like receptacle 6.

The cup-like bottom member 2 is provided with an outlet nipple 7 for the discharge of the liquid disinfectant or deodorant. Within the canister and resting upon bottom C is the liquid holding member 8. It will be seen that said holder is of substantially less diameter than the interior of the canister, and that it is provided with an upwardly projecing tube $8^x$. The liquid holding member 8 is provided with a cover member 9 having a handle or thumb-piece 10 to enable its ready removal, the cover member being provided with a depending tube 11 adapted to be projected within tube $8^x$ of the liquid holding member. Projecting upwardly from horizontal wall C of the canister is a hollow wick holder 12 which receives a wick 13, the wick passing through wall C and to a point immediately above shallow cup-like receptacle 6. The wick is turned over the top of wick holder 12 and leads downwardly to the horizontal wall C, and preferably in contact therewith.

The bottom wall of the liquid holding member is closed except for an opening controlled by a valve. The said opening, indicated at 14, is conical in shape and located at the base of a sleeve 15 within the liquid holding member, which sleeve guides the movements of a valve rod 16. At the end of the valve rod is a conical valve head 17 which is normally held in closed position by a spring 18 (Figure 2).

When the liquid holding member is placed in position within the canister, it rests upon short legs 19, which contact with horizontal wall C of the canister. The placing of the liquid holding member within the canister does not result in the flow of liquid therefrom. The flow is caused by dropping the cover member 9 into position whereupon its upper wall contacts with the upper end of valve rod 16 and moves the latter downwardly to withdraw valve head 17 from its seat. The liquid then flows onto horizontal wall C and maintains its flow until it assumes a level at or slightly above the lower edge of the cover member. The liquid is permitted to flow downwardly because air may pass upwardly intermediate tubes $8^x$ and 11.

In practice, also, the cover member will fit loosely upon the liquid containing member so that air can pass between the two until it reaches the upper surface of the liquid content. When, however, the liquid on horizontal wall C rises until it meets the lower edge of the cover member, the passageways for air to the liquid are closed and the liquid will not flow through valve 14, 17, until the level of wall C within the canister falls below the edge of the cover member and again permits air to pass into the liquid containing member.

The capillary action of the wick will be such that it will constantly draw liquid upon the canister and cause its passage drop by drop to the shallow cup-like member 6. When the liquid in member 6 overflows the latter, it passes down within member 2 and thence through nipple 7 as above set forth.

In Figures 5 and 6 I have illustrated a liquid holding member 20 which is substantially the same as that illustrated in Figures 1 and 2 with the exception that its cover member 21 is provided with a tube 22 which projects within the liquid containing chamber of member 20 and therefore is sealed by the liquid therein. The air is permitted to pass from below the liquid containing member through its tube 23 and thence through inlet or inlets 24. The cover member fits loosely upon the liquid containing member and air may pass up between the two and thence through inlets 25. When, however, the liquid on wall C reaches such a height that it contacts with the bottom wall of the liquid holding member, tube 23 and also passage intermediate the liquid holding member and its cover will be sealed.

In Figure 8 the liquid receiving member or reservoir 26 is provided with a short upwardly projecting chamber 27 for the reception of the wick and its tube. Communicating with an opening 28 through the bottom wall 26ˣ of the reservoir is an air-vent tube 29 having its outlet near the top of the reservoir. The cover member 30 may be loosely mounted upon the reservoir so as to permit the passage of air between the two and the reservoir at its top may be formed with inlet passages 31 for permitting air to flow into contact with the liquid.

In the operation of the construction shown in Figures 7 and 8, air will pass upwardly through vent tube 29 and into the reservoir and may also pass intermediate the reservoir and its cover member and through passages 31. When, however, the level of the liquid on wall C of the canister rises so as to seal opening 28 and the passage intermediate reservoir and its cover, further flow of liquid through valve 14, 17 will cease.

The above means provides an accurate control of the liquid discharge from the reservoir. Inasmuch as the liquid passes drop by drop from that part of the canister above the wall C, it will likewise pass drop by drop through nozzle 7. The depth of immersion of wick 13 may be definitely regulated by the distance between the vent tubes or passages and wall C. The construction illustrated in Figures 5 and 7 possesses some advantages over that illustrated in Figures 1 to 4 inclusive, inasmuch as the placing of the cover member in position does not subject the wick 13 to contact with the cover member tube and the cover member may always be placed in its final and proper position so as to insure depression of the valve rod and opening of the valve. The modified constructions also insure passage of a sufficient amount of air to the liquid within the reservoir, which liquid is frequently oily or viscid, to insure the proper flow thereof through the valve, by atmospheric pressure and gravity. In either form of the device the parts are so constructed and arranged that they may be readily manufactured and assembled at low cost.

Having described my invention what I claim and desire to secure by Letters Patent is as follows:—

In devices of the character described, a barometric feed device for use in combination with a canister having a horizontal supporting wall and a wick device passing through an aperture in said wall and leading to an evaporating pan carried by the canister below said wall, said barometric feed device comprising a reservoir member formed with a centrally located upwardly projecting wick receiving tube, and a cover member having a depending tube adapted to lie in telescopic relation to the upwardly projecting tube, a valve rod supported vertically in bearings supported by the reservoir member, and passing through an opening in the base of said member, a valve carried by the rod, a spring engaging the valve to normally close the same, the arrangement being such that when the cover member is placed in position its top wall engages the rod and moves the valve against the tension of said spring.

In testimony whereof, I have signed my name to this specification.

LOUIS KOOPERSTEIN.